(No Model.)

T. J. HOGAN.
PIPE COUPLING.

No. 444,179.     Patented Jan. 6, 1891.

WITNESSES:
Snowden Bell
F. E. Gaither.

INVENTOR,
Thomas J. Hogan.

United States Patent Office.

THOMAS J. HOGAN, OF PITTSBURG, PENNSYLVANIA, ASSIGNOR TO THE WESTINGHOUSE AIR BRAKE COMPANY, OF SAME PLACE.

PIPE-COUPLING.

SPECIFICATION forming part of Letters Patent No. 444,179, dated January 6, 1891.

Application filed October 20, 1890. Serial No. 368,667. (No model.)

*To all whom it may concern:*

Be it known that I, THOMAS J. HOGAN, a citizen of the United States, residing at Pittsburg, in the county of Allegheny and State of Pennsylvania, have invented or discovered a certain new and useful Improvement in Pipe-Couplings, of which improvement the following is a specification.

The object of my invention is to provide a detachable coupling for pipes or hose which shall be of simple and inexpensive construction, and in which the gaskets which insure the air-tight joint between the two halves of the coupling shall be capable of being easily removed and replaced; and to this end my invention, generally stated, consists of a coupling-shell made in one piece with no openings except those intended for the passage of air, and in which the device for holding the gasket in place is inserted through the opening for the passage of air which is formed in the face of the coupling-shell.

Figure 1:
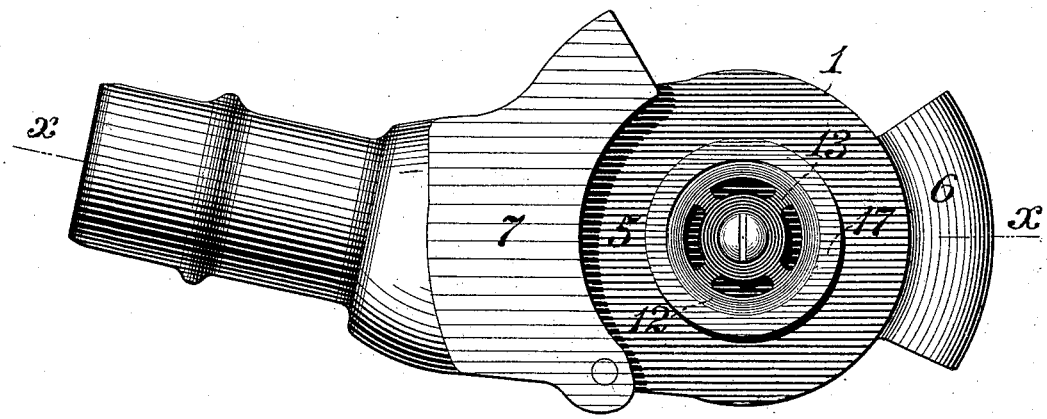
Figure 2:
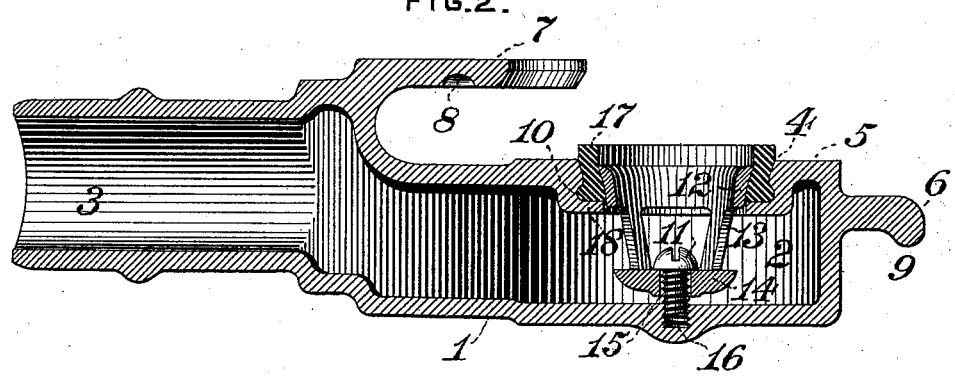
Figure 3:
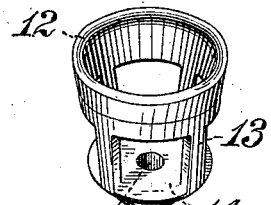

In the accompanying drawings, Figure 1 is an elevation of one of the halves or sections of the coupling embodying my invention; Fig. 2, a longitudinal section through the same at the line *x x* of Fig. 1, and Fig. 3 a perspective view of the device for holding the gasket in place.

My improvement is more particularly designed for the purpose of coupling together flexible pipes or hose such as are employed with brake systems for connecting the train-pipes between the cars, but is equally applicable for other purposes.

As is usual in couplings employed in standard practice for connecting pipes between cars, the two parts which are coupled together are made exactly alike, so that any two of them may be coupled together. For this reason I have illustrated but one one half of the coupling.

As shown in the drawings, the half-coupling consists of a shell 1, in which is formed a chamber 2, which connects by a passage 3 with the pipe to which the coupling is permanently attached, and which has an opening 4 through the face 5 of the shell. At one end of the shell and formed integral therewith is a projection 6, and near the middle of the shell a flange 7 is formed, with a groove 8 in its inner surface for the purpose of receiving the rounded edge 9 of the projection 6 of the other half-coupling when the faces of the two half-couplings are brought together and coupled so that the openings 4 in their faces register one with the other.

In order to form an air-tight joint between the two half-couplings, it is customary to employ a packing-gasket of rubber or similar material in the opening 4, and the special object of my invention is to provide a simple means for securing this gasket in place. For this purpose I form the wall of the opening 4, as shown in the drawings, with a groove 10, to receive a bead or projection formed on the lower edge of the gasket 17, and a flange 18 on the inner side of the opening, against which the inner edge of the gasket bears. To hold the gasket in place I employ a tapered ring 12, to which are connected webs or ribs 13, which connect the ring with a central piece 14, the tapered ring 12, ribs 13, and disk 14 forming a basket-shaped structure which, when the compressing-ring 12 is in position, extends into the chamber 2 of the shell. Through the bottom of the basket there is formed a hole 15, through which a screw 11 passes and screws into a hole 16, tapped in the wall of the coupling-shell. This basket, with the tapered ring 12, ribs 13, central piece 14, and adjusting-screw 11, forms a compressor which holds the gasket in place, and which may be quickly and easily removed through the opening 4 by first unscrewing the screw 11.

The ribs 13 may be made parallel instead of inclined, as it is only necessary that the ring 12 which bears on the gasket should be tapered. Two or more webs or ribs 13 may be employed, and it is not necessary that the part 14 should be in the form shown, but only that a connecting-piece between the ribs be employed, through which a hole 16 may be formed to receive the screw 11—that is, it is only necessary that a yoke should be attached to the ring 12 and extend into the chamber 2 in proper position to receive the adjusting-screw 11. It is not even necessary that the yoke should be formed integral with the ring, as it may be bent over at its outer ends to rest on the outer edge of the ring, so that when the screw draws upon it it presses the ring into place.

The gasket is preferably of the form shown with the bead on one edge and its inner surface tapered to receive the tapered ring; but it is evident that the form may be varied.

The gasket is first placed in position and the compressor is then inserted, so that the tapered ring 12 bears on the gasket. The screw 11 is then passed through the hole 15 and screwed into the hole 16, so as to draw the ring 12 down on the gasket, thereby expanding the gasket out against the walls of the opening 4 and pressing the bead on the gasket into the groove 10, so as to hold the gasket firmly in place. The ring 12 may be made narrower than shown, if desired, so that its outer edge will come farther inside of the edge of the gasket to allow of some movement of the free edge of the gasket when pressed on by the edge of the gasket in the other half-coupling in the operation of uncoupling. It will be seen that by this construction I am enabled to use a coupling-shell with a solid back, avoiding the screw-plug usually employed to fit the opening required for the insertion of the gasket-compressing ring, and which is objectionable as adding to the expense of construction, increasing the weight of the coupling, and being difficult to remove on account of the tightness with which it must be fitted in order to make an air-tight joint. My construction also provides a continuous support for the inner surface of the gasket, which prevents any irregular bulging inward, such as may occur where the compressor-ring is entirely within the chamber 2 or where the support does not extend entirely around the inner face of the gasket. The compressor may be removed or replaced through the opening 4, so that a broken one may be replaced. The tightening and loosening of the compressor is accomplished by merely turning the small screw 11 without turning the compressing-ring, thereby avoiding the use of a special tool for removing the ring, such as is required where the ring must be turned to be removed, the tool in such cases usually being required to fit into notches or against projections on the ring. I also avoid a very great objection to that form of ring which must be turned in order to be removed, and that is the difficulty of removal or adjustment due to the very great friction between the ring and the rubber gasket.

What I claim as my invention, and desire to secure by Letters Patent, is—

1. In a pipe-coupling, the combination, with a coupling-shell having an opening in its face for the passage of fluid, of a gasket fitted in the opening, a tapered ring bearing against the inside of the gasket for pressing the gasket into place, a yoke connected to the ring, and an adjusting-screw passing through the yoke and screwing into the shell of the coupling, substantially as set forth.

2. In a detachable pipe-coupling, the combination of a coupling-shell having an opening in its face formed with a groove in its wall, and a flange on the inner side of the opening, a gasket resting with its inner edge on the flange, and a tapered ring bearing against the inside of the gasket and so arranged as to be drawn toward the back of the shell by an adjusting-screw which passes through a yoke formed on the ring and screws into the back of the shell, whereby the gasket is pressed into the groove in the wall of the casing and supported on its inner face, substantially as set forth.

In testimony whereof I have hereunto set my hand.

THOMAS J. HOGAN.

Witnesses:
R. H. WHITTLESEY,
J. SNOWDEN BELL.